United States Patent [19]

Fix et al.

[11] Patent Number: 4,846,377
[45] Date of Patent: Jul. 11, 1989

[54] LIMP, POROUS MEMBRANE FOR A FLUIDIZED OUTLET

[75] Inventors: Perry D. Fix, St. Charles County; William B. Rogers, Jackson County, both of Mo.

[73] Assignee: ACF Industries, Incorporated, Earth City, Mo.

[21] Appl. No.: 45,411

[22] Filed: May 4, 1987

[51] Int. Cl.[4] .............................................. B65G 69/06
[52] U.S. Cl. ..................................... 222/195; 406/91; 222/630
[58] Field of Search .................. 222/195, 630; 406/91, 406/138; 366/101, 106, 107

[56] References Cited

U.S. PATENT DOCUMENTS

| | | | |
|---|---|---|---|
| 3,448,900 | 6/1969 | Jakobsson et al. | 406/91 |
| 3,659,752 | 5/1972 | Carney, Jr. et al. | 222/195 |
| 3,708,209 | 1/1973 | Dugge | 406/91 |
| 4,280,706 | 4/1981 | Vorwerk | 277/12 |
| 4,413,758 | 11/1983 | Walters | 222/195 |
| 4,428,585 | 1/1984 | Dugge | 277/12 |
| 4,568,244 | 4/1986 | Dugge et al. | 406/90 |
| 4,673,112 | 6/1987 | Bonerb | 222/389 X |

FOREIGN PATENT DOCUMENTS 722561 1/1955 United Kingdom ............... 222/195

Primary Examiner—H. Grant Skaggs
Attorney, Agent, or Firm—Polster, Polster and Lucchesi

[57] ABSTRACT

A limp, porous membrane of sheet (i.e., cloth) material for a fluidized outlet is disclosed. The outlet is in communication with a container, such as a hopper within a covered hopper railway car, containing a supply of particulate material for being fluidized and unloaded via the outlet. The outlet comprises an outlet housing, an outlet frame for securing the outlet housing to the hopper, an outlet opening, and outlet walls extending from the frame to the outlet opening. The membrane is secured to the outlet frame and to the outlet opening and is disposed generally on the inside faces of the outlet walls. A manifold is provided for introducing a fluidizing fluid (e.g., air) under pressure between the outlet walls and the membrane such that the fluidizing fluid flows through the membrane thereby to fluidize the lading above the membrane. A stiffener extends from the outlet frame to the outlet opening for holding the limp membrane generally in face-to-face relation with the outlet wall in at least the area of this holder during fluidization of the lading.

4 Claims, 2 Drawing Sheets

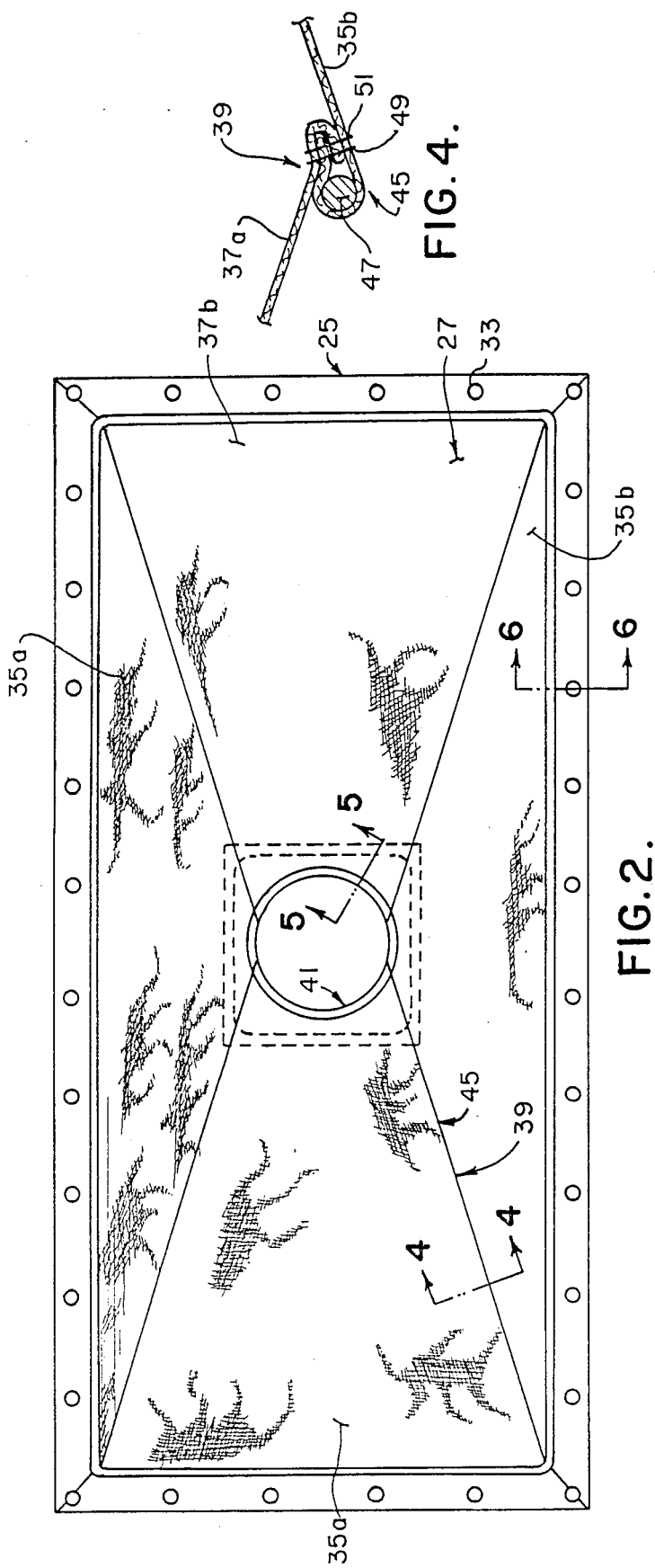

LIMP, POROUS MEMBRANE FOR A FLUIDIZED OUTLET

BACKGROUND OF THE INVENTION

This invention relates to a limp, porous membrane of sheet or cloth material for a fluidized outlet. More specifically, this invention relates to the fluidized outlet of a covered hopper railway car.

Generally, when unloading a bulk pulverant, powdered, or particulate lading from a hopper, such as a hopper of a covered hopper car, such ladings have a tendency to bridge and column inside the hopper. In order to continue the unloading, it is a common practice to vibrate or hammer on the outside of the hopper, thereby to dislodge the bridged and columned lading. It is also conventional to use probes inserted into the lading from above the break up the bridges and columns within the lading.

It has been known that by using a fluidized outlet built into the bottom of the hopper, fluidizing fluid (e.g., air under relatively low pressure, 5–15 psi) flowing through a fluidizing, porous membrane and into the powdered or particulate lading in contact with the membrane would cause the lading to be fluidized so that the lading would flow as freely as a liquid. This resulted in faster and much more efficient unloading of the railway hopper car.

As shown in the co-assigned U.S. Pat. Nos. 4,280,706 and 4,568,244, prior art fluidizing membranes conventionally comprised a porous screen or the like made of fine mesh stainless steel. However, while stainless steel fluidizing membranes were relatively impervious to moisture pick-up, could be readily cleaned, and were long-lasting, they were relatively expensive, both to install and to replace if necessary. On a larger size of outlets where the outlet had both side and end walls converging inwardly and downwardly from the central lower outlet opening, the stainless steel membrane was often formed in one piece so as to be disposed on the inside faces of the end and side walls. During unloading, particularly upon exhausting of all or substantially all of the lading from within the hopper, the stainless steel mesh, which was relatively rigid, had sufficient force to withstand the static air pressure behind the porous membrane in the outlet walls without damage to the porous membrane.

It has long been recognized that limp fabric membranes could be used in place of the stainless steel membranes with large attendant cost savings. However, cloth membranes were relatively difficult to seal relative at the connection of the cloth membrane and the outlet frame and to the outlet opening at the bottom proximate the outlet opening. In addition, cloth membranes oftentimes did not have sufficient strength to withstand the static air pressure therebehind when the lading was nearly withdrawn from the outlet. It will be appreciated that the static air pressure would tend to "balloon" the membrane material away from the walls of the outlet when the hopper was substantially free of the lading thus putting undue tearing forces on the membrane where it joined the outlet frame and the bottom outlet. As a consequence, oftentimes, fabric membranes were only used in relatively small panels in which the cloth membrane could be secured around its periphery to a rigid metal frame, such as shown in the co-assigned U.S. Pat. No. 4,280,706.

Thus, there has been a long-standing need for a relatively inexpensive, limpcloth fluidizing membrane which could be used on large fluidized outlet walls and surfaces which did not experience undue "ballooning" when pressurized such that the membrane would remain attached to the outlet, both at the outlet frame and at the outlet opening.

SUMMARY OF THE INVENTION

Among the several objects and features of the present invention may be noted the provision of a limp, porous membrane of sheet material (e.g., a cloth-like material) for a fluidized outlet which, is nevertheless held generally in face-to-face relation with the outlet walls during fluidization of the lading;

The provision of such a fluidizing membrane which, on larger size fluidized outlets, permits the use of limp cloth membranes in place of more expensive stainless steel membranes for use with a wide variety of pulverant, particulate ladings;

The provison of such a limp membrane for a fluidized outlet which will hold its shape;

The provision of such a limp, cloth-like membrane which will resist "ballooning" forces when exhaustion of the lading from within the hopper is near complete, and when fluidizing fluid remains connected to the fluidization system; and The provision of such a limp fluidizing membrane which may be readily incorporated in a number of outlets of various sizes, which is of rugged construction, which is reliable in operation, which may be readily cleaned, and which has a long service life.

Other objects and features of this invention will be in part apparent and in part pointed out hereinafter.

Briefly stated, a limp or porous membrane of sheet material for a fluidized outlet is disclosed. The outlet is in communication with a container, such as a hopper of a covered hopper car or the like, containing a supply of particulate material for being fluidized and unloaded via the outlet. The outlet comprises an outlet housing, an outlet frame for securing the outlet housing to the hopper, an outlet opening, and an outlet walls extending from the frame to the outlet opening. The membrane is secured to the outlet frame and the outlet opening, and is disposed generally on the inside faces of the outlet walls. Means is provided for introducing a fluidizing fluid under pressure between the outlet walls and the membrane, such that as the fluidizing fluid flows through the membrane the lading is fluidized. Further, means carried by the membrane and extending from the outlet frame to the outlet opening is provided for holding the membrane in face-to-face relation with the outlet walls at least the area of this holding means during fluidization of the lading.

BRIEF DESCRIPTION OF THE DRAWINGS

FIG. 2 is a top plan view of the membrane assembly;

FIG. 3 is a side elevational view of the membrane assembly;

FIG. 4. is a cross sectional view, taken along line 4—4 of FIG. 2, illustrating, on an enlarged scale, means carried by the membrane assembly for holding the membrane assembly in place relative to the walls of the outlet;

Corresponding reference characters indicate corresponding parts throughout the several views of the drawing.

DESCRIPTION OF A PREFERRED EMBODIMENT

Figure 1:
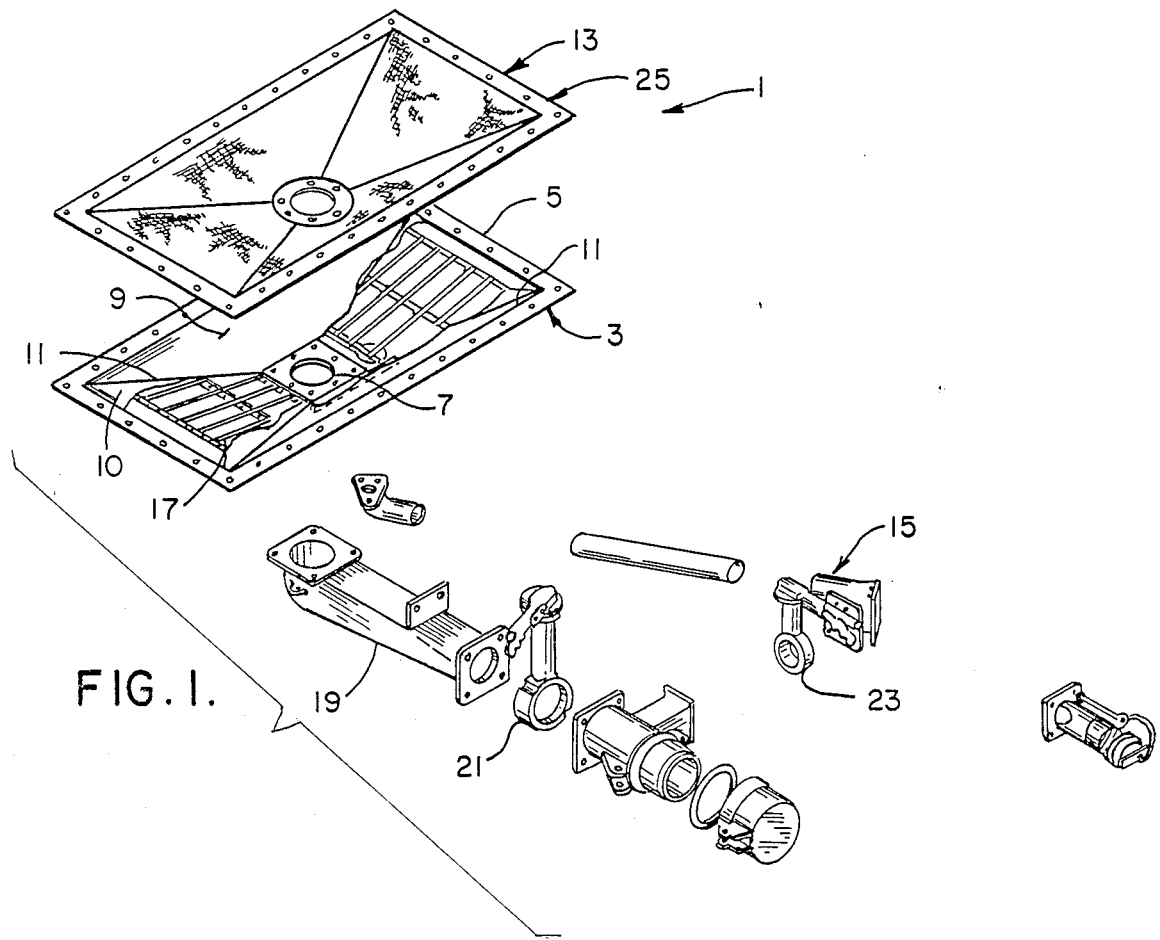
FIG. 1 is an exploded view of a fluidized outlet for a railway hopper car, showing a membrane assembly of the present invention.

Referring now to the drawings, and particularly to FIG. 1, a pneumatic, fluidized outlet is indicated in its entirety by reference character 1. This outlet 1 is adapted to be bolted to the lower portion of a hopper (not shown), such as a hopper of a covered hopper railway car utilized to transport a wide variety of bulk particulate, powdered, granular, or other pulverant ladings. It will be appreciated that within the broader aspects of the present invention, the term "particulate" is used generally to refer to any powdered, granular, or other dry, flowable lading.

More specifically, outlet 1 is shown to comprise an outlet housing 3, having an outlet frame 5 at its upper end, and an outlet opening 7 at its lower center portion. The outlet further has a plurality of outlet end and side walls 9 and 10, respectively, sloping inwardly and downwardly from outlet frame 5 toward outlet opening 7. As indicated at 11, so-called valleys are formed at the intersections between the side and end walls.

In accordance with this invention, a fluidizing membrane assembly, as generally indicated at 13, is provided on the inside faces of the outlet walls 9 and 10. Means 15, referred to as a fluidizing air manifold, is provided for introducing a fluidizing medium (i.e., air under pressure) between the outlet walls 9 and 10 and fluidizing membrane 13, such that the fluidizing medium will flow through the porous membrane and tend to fluidize the lading in close proximity to the membrane, such that the lading will flow, as a liquid, downwardly over the inner surfaces of the membrane toward outlet opening 7, thus greatly facilitating the unloading of pulverant material from within the hopper. A fluidizing air distribution manifold 17 may optionally be provided between outlet walls 9 and 10 and fluidizing membrane 13 so as to be in communication with means 15 so as to distribute the fluidized medium between the outlet walls and the membrane assembly 13.

As indicated at 19, an outlet manifold is secured to the bottom portion of the outlet walls so as to be in communication with outlet opening 7 such that the fluidized lading may be removed from the outlet in any conventional manner, such as by pneumatic conveying, or the like. It is intended that outlet 1 is a pressure differential outlet such that elevated pressure of a predetermined level (e.g., 5 psi) may be exerted upon and maintained within the hopper of the hopper car. Fluidizing air introduced into outlet 1 via fluidizing means 15 and manifold 17 will, of necessity, be of a somewhat higher pressure level so that the fluidizing air will flow freely through membrane 3 and fluidize the lading in close proximity to the membrane. Upon the lading being fluidized and flowing downwardly for unloading via outlet opening 7, the elevated pressure within the hopper forces the fluidizing lading out of manifold 19 and into a conduit (not shown) for pneumatically conveying the lading away from the outlet. An outlet control valve 21 is provided for regulating the flow of lading from the outlet. A fluidizing air bypass valve 23 is provided between fluidizing air manifold 15 and outlet manifold 19 such that the amount of fluidizing air admitted into distribution manifold 17 for fluidizing of the lading may also be regulated.

Figure 6:
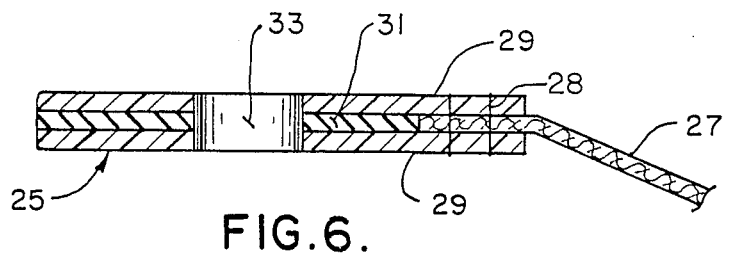
FIG. 6 is a cross sectional view, taken along line 6—6 of FIG. 2, illustrating the gasket on an enlarged scale utilized to seal the porous membrane between the outlet frame and the hopper frame.

Referring now to FIGS. 2-6, the fluidizing membrane assembly 13 is shown to comprise a gasket 25 around its upper edge with a cloth membrane, as indicated at 27, secured (stitched) to the gasket, as indicated at 28 (see FIG. 6). Gasket 25 comprises upper and lower gasket members 29 with an elastomeric strip 31 therebetween. Securement bolt holes 33 are provided at desired spaced locations (as shown in FIG. 2) such that the gasket may be bolted between outlet frame 5 and a corresponding hopper frame (not shown). For example, the gasket material may be constructed in accordance with the gasket disclosed and claimed in the co-assigned U.S. Pat. No. 4,428,585, which is herein incorporated by reference.

Figure 5:
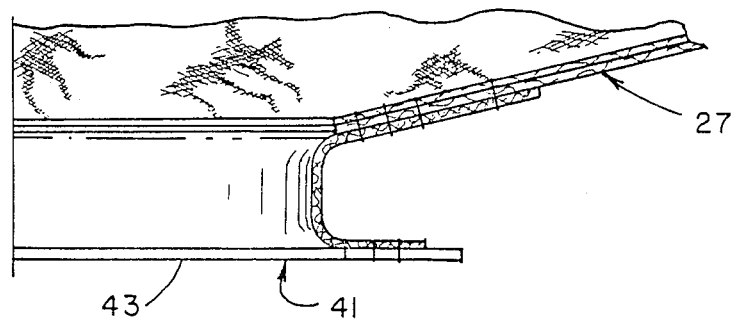
FIG. 5 is a vertical cross sectional view of an outlet boot of the membrane assembly, taken along line 5—5 of FIG. 2.

Membrane assembly 13 further comprises generally trapezoidal side panels 35a, 35b disposed on opposite sides of the membrane, and end panels 37a, 37b at opposite ends of the membrane assembly. The membrane side and end panels are disposed to be generally in face-to-face contact with the inside respective faces of outlet side and end walls 9 and 10. Further, the membrane side and end panels are joined together along membrane panel intersections, as generally indicated at 39, which in the outlet frame in FIG. 1, tend to overlie valleys 11 between outlet walls 9 and 10. A boot assembly 41 is secured to the lower margins of the side and end panels, in the manner illustrated in FIG. 5, such that the membrane assembly may be rigidly connected to outlet housing 3 surrounding the outlet opening 7. The boot includes a gasket 43 (as best shown in FIG. 5) at the lower margin thereof for being rigidly secured to the lower portion of the outlet housing.

In accordance with this invention, a membrane stiffener, as generally indicated at 45, is carried by the permeable membrane generally at the locations of the intersections 39 so as to support the membrane side and end panels between gasket 25 and boot 41 thereby to prevent undue "ballooning" of the side and end panels during fluidization, and more particularly when the lading is substantially unloaded therefrom and when fluidizing air continues to enter via the fluidizing air inlet means 15. More specifically, each membrane stiffener, as shown in FIG. 4, comprises an elongate, rigid rod 47 of suitable metal (e.g., stainless steel or the like) which is held captive within overlapping panel portions 49 of the side and end panels 35a, 35b and 37a, 37b, respectively, which are stitched together along lines of stitching 51.

In this manner, with fluidizing membrane assembly 13 disposed on the inside faces of outlet housing walls 9 and 10, with gasket 25 secured between outlet frame 5 and the hopper frame (not shown), and with boot 41 secured to the bottom of the outlet frame, membrane stiffeners 45, and particularly rods 47, hold the intersecting edges of the side panels 35a, 35b and the end panels 37a, 37b in close proximity to the inner faces of the outlet walls in the general proximity of valleys 11 without placing undue stresses or tear-out forces on the fabric membrane adjacent gasket 25 or boot 41. However, those skilled in the art will appreciate that the membrane stiffeners 45 of the present invention do permit a limited amount of "ballooning" action of the flexible membrane between the stiffeners which aids in clean-out of the outlet by forcing any residual lading clear of the membrane and to fall into the outlet opening.

In this manner, a porous, limp cloth membrane can be utilized on large size outlets in place of rigid and more expensive stainless steel mesh outlets, without the necessity of the outlet membrane being divided into small panels and secured around all of the edges to the outlet frame. Additionally, a more complete clean-out of the particulate lading material is possible.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and hot in a limiting sense.

What is claimed is:

1. A limp, porous membrane of flexible sheet material for use with a fluidized outlet, said outlet being in communication with a container, such as a hopper, containing a supply of a particulate lading for being fluidized and unloaded via said outlet, said outlet comprising an outlet housing having an outlet frame for securing said outlet to said hopper, an outlet opening, and intersecting outlet walls extending downwardly from said frame to said outlet opening and having valleys between adjacent outlet walls, said membrane being secured to said outlet frame and to said outlet opening and being disposed generally on the inside face of said outlet walls and supported thereby, means for introducing fluidized fluid under pressure between said outlet walls and said membrane such that fluid flows through said membrane so as to fluidize said lading, and stiffener means carried by said membrane extending generally from said outlet frame to said outlet opening for holding said limp membrane generally in face-to-face relation with said outlet walls and in close proximity to the valleys between adjacent outlet walls during fluidization of said lading.

2. A limp membrane for a fluidized outlet as set forth in claim 1, wherein said membrane comprises a plurality of panels which are joined to one another in juncture areas which are in general alignment with the valleys between adjacent outlet walls, and said stiffener means engages said panels in the areas of juncture therebetween to hold same in close proximity to the valleys between adjacent outlet walls.

3. A limp membrane for a fluidized outlet as set forth in claim 2, wherein said stiffeners comprising a metal rod held captive by a portion of said membrane stitched on itself.

4. A limp membrane for a fluidized outlet as set forth in claim 3 having a gasket around its upper edge for being sealed with respect to said outlet frame and a boot at is lower end, said boot being securable to said outlet opening, said stiffener means comprising elongated stiffeners extending substantially from said gasket to said boot.

* * * * *